US012028241B1

(12) United States Patent
Sood et al.

(10) Patent No.: US 12,028,241 B1
(45) Date of Patent: Jul. 2, 2024

(54) BACKUP PATH DETERMINATION FOR OPTICAL NETWORKS

(71) Applicant: Cisco Technology, Inc., San Jose, CA (US)

(72) Inventors: Navdeep Sood, Karnataka (IN); Praveen Kumar, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/219,990

(22) Filed: Jul. 10, 2023

(51) Int. Cl.
*H04L 45/00* (2022.01)
*H04L 45/28* (2022.01)

(52) U.S. Cl.
CPC .............. *H04L 45/22* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 9,577,873 B2* | 2/2017 | Kayser | .......... H04L 45/308 |
| 2012/0057868 A1 | 3/2012 | Wang et al. | |
| 2012/0321308 A1 | 12/2012 | Lee et al. | |
| 2014/0185432 A1* | 7/2014 | Liu | ............ H04L 41/0896 370/228 |
| 2017/0085316 A1 | 3/2017 | Al Sayeed et al. | |
| 2017/0118546 A1 | 4/2017 | Lee et al. | |
| 2017/0207996 A1* | 7/2017 | Lui | ............ H04L 43/0829 |
| 2018/0351652 A1 | 12/2018 | Ashrafi | |

OTHER PUBLICATIONS

Backhaus et al., "Robust and Scalable Routing in Wireless Mesh Networks Using Interference—Disjoint Backup Paths", Nov. 15, 2019, IEEE, 2019 12th IFIP Wireless and Mobile Networking Conference (WMNC) (pp. 103-110) (Year: 2019).*

* cited by examiner

*Primary Examiner* — Davoud A Zand
(74) *Attorney, Agent, or Firm* — Lee & Hayes, P.C.

(57) ABSTRACT

Backup communication paths can be determined for use by different circuits of a network in the event of a failure of active communication paths. The disclosed backup path determination techniques can reduce contention in which multiple circuits share a backup path. Contention metrics are determined for communication paths in the network. The contention metrics are used to determine a communication path for contention reduction. A circuit that uses the communication path as a backup path is selected, and the backup path of the selected circuit is modified to avoid the communication path. Contention metrics can then be recalculated, and contention reduction techniques can be repeated until a desired convergence point is reached.

20 Claims, 8 Drawing Sheets

BACKUP PATH DETERMINATION FOR OPTICAL NETWORKS

TECHNICAL FIELD

The present disclosure relates generally to determining backup communication paths in communication networks, and for optical communication networks in particular.

BACKGROUND

Next generation optical networks, such as dense wavelength-division multiplexing (DWDM) networks, generally include complex mesh topologies. Such networks have deployed colorless, contentionless, omnidirectional, flex spectrum (CCOFS) technology, and include nodes and fiber links between the nodes. Circuits can be created between two target nodes, called head and tail nodes, using either a centralized control plane or a distributed control plane. A centralized control plane can be implemented using, e.g., a path computation element (PCE) and a software defined network (SDN). A distributed control plane can be implemented using, e.g., a wavelength switched optical network (WSON).

In the PCE/SDN approach as well as the WSON approach, there is no dedicated backup path reservation for working circuits. For a given single circuit, it is possible for a specialist to manually analyze the network and predict whether restoration upon a failure of the active path and towards a specific given backup path will work or not, as long as there are no other completing circuits for the same backup path. However, as the number of circuits increases, the prediction of whether restoration will succeed on a given backup path becomes progressively more complex and quickly becomes impossible to predict. There is presently no clear method to predict in advance whether there will be a resource conflict during restoration of a failure that impacts several circuits at the same time.

Therefore, there is a need for techniques to reduce, minimize, and/or eliminate backup path resource conflicts in networks such as optical communication networks that include multiple different potential communication paths.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques related to backup path determination for optical networks. According to an example embodiment, a method can be performed by a network controller device that calculates backup communication paths for use by different circuits in the event of a failure of one or more active communication paths. An example method can include determining a first contention metric associated with a first communication path between first nodes of an optical network. The first contention metric can be based on a first number of first circuits designating the first communication path as part of first backup paths for use in response to failure of first active paths used by the first circuits. The example method can further include determining a second contention metric associated with a second communication path between second nodes of the optical network. The second contention metric can be based on a second number of second circuits designating the second communication path as part of second backup paths for use in response to failure of second active paths used by the second circuits. The example method can further include determining to reduce, e.g., the first number of first circuits, based at least in part on the first contention metric and the second contention metric, and reducing, e.g., the first number of first circuits by modifying at least one of the first backup paths, resulting in a modified backup path that avoids the first communication path.

The techniques described herein may be performed by a network controller device comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

Example Embodiments

Techniques disclosed herein can determine backup paths for circuits in optical networks. The disclosed backup path determination techniques are also applicable in other networks, other than optical networks, however, an optical network environment is used as a primary example in this disclosure.

Optical networks generally include multiple distributed nodes connected by fiber optic cable links. For example, multiple nodes may be distributed in a region such as a city, a county, a state or a country. The nodes can be connected via fiber optic cable links that support communication via multiple light wavelengths. Some fiber optic cables support communication using any of ninety-six (96) different wavelengths, although other numbers of wavelengths can also be supported, and multiplexing can be used to further expand the capacity of a fiber optic cable link. A connection between nodes via a designated fiber optic cable link and an optionally multiplexed wavelength is referred to herein as a communication path.

Circuits can be established in an optical network. Circuits can be used for communications between two or more different entities. For example, an entity A and an entity B can communicate via a circuit established in the optical network. The circuit can have an active path as well as one or more predetermined backup paths. The active paths are established for active use by the circuit, while the backup paths are established for use when an active path fails, such as when a fiber optic cable link used in an active path is cut or otherwise becomes unavailable. In the event of an active path failure, the presence of a predetermined backup path allows the circuit to be restored with minimal disruption.

It is possible that circuits may share a backup path, or that one or more communication path segments that are included in a backup path for a circuit may also be included in other backup paths of other circuits. The inclusion of a same communication path segment in multiple backup paths for multiple circuits is referred to herein as backup path contention.

Techniques according to this disclosure can generally be applied to measure backup path contention in an optical network. Furthermore, the disclosed techniques can be applied to reduce backup path contention, thereby facilitating restoration of circuits in an optical network in the event of active path failure.

The disclosed techniques can define a "contention metric," or measure of backup path contention. The disclosed techniques can then determine contention metrics associated with the different communication paths in an optical network and can store the resulting contention metric information. The disclosed techniques can then, either occasionally or in response to a network event, apply the processes disclosed herein to reduce backup path contention of the communication paths.

To reduce backup path contention of the communication paths, the disclosed techniques can identify a high-contention communication path, identify one or more circuits that include the high-contention communication path in their backup path, and re-calculate the backup paths of the one or more circuits in a manner that avoids use of the high-contention communication path. The process can be repeated as needed for other high-contention communication paths.

In some embodiments, a high-contention communication path can be identified by comparing contention metrics. For example, in embodiments wherein a lower contention metric is associated with higher backup path contention, identifying a high-contention communication path can comprise identifying a communication path with a relatively lower contention metric than one or more other communication paths.

For example, a communication path with a lowest contention metric can be selected. Furthermore, a contention metric threshold can be established, and the high-contention communication path can be identified as a communication path with a contention metric that violates the contention metric threshold by falling below the contention metric threshold.

In an inverse arrangement, in embodiments wherein a higher contention metric is associated with higher backup path contention, identifying a high-contention communication path can comprise identifying a communication path with a relatively higher contention metric than one or more other communication paths. For example, a communication path with a highest contention metric can be selected. Furthermore, the high-contention communication path can be identified as a communication path with a contention metric that violates the contention metric threshold by exceeding the contention metric threshold.

Techniques disclosed herein can also select which circuits that use a high-contention communication path will be selected for backup path recalculation. To select a circuit, example techniques can combine, for each circuit, the contention metrics of communication paths used in the circuit's backup path. The resulting combinations can then be compared and used to select circuits for backup path recalculation. For example, a circuit associated with a higher, or highest, aggregate/combined contention metric can be selected for backup path recalculation. Conversely, in some embodiments, a circuit associated with a lower, or lowest, aggregate/combined contention metric can be selected for backup path recalculation.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
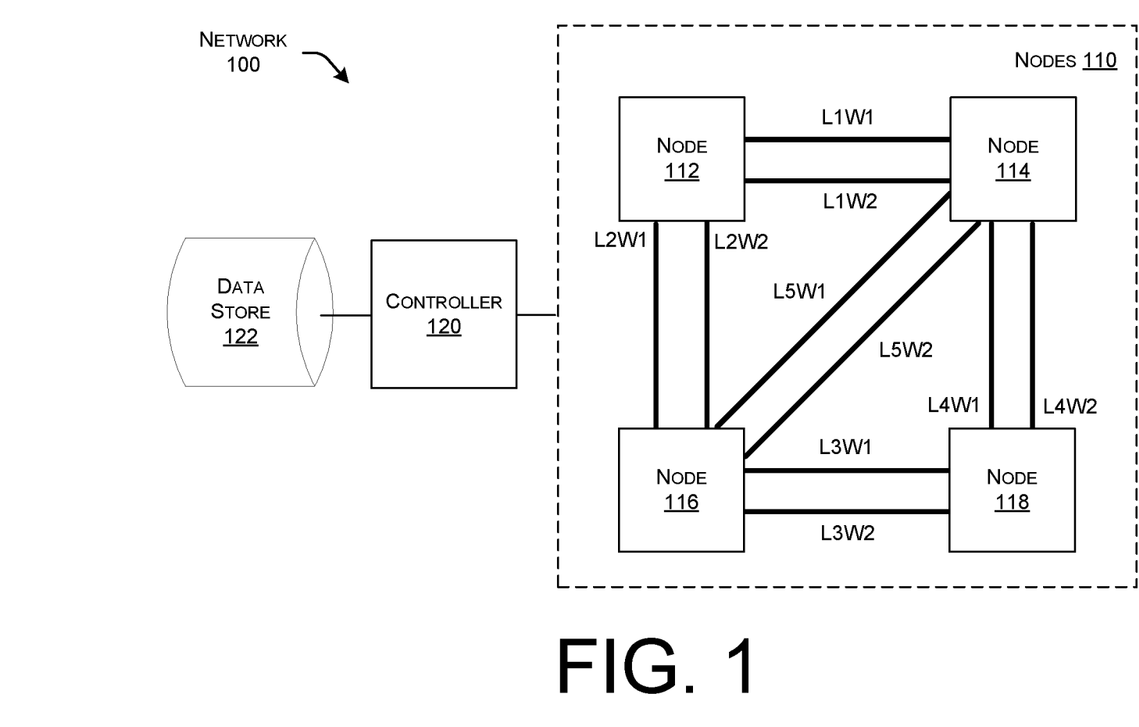
FIG. 1 illustrates an example network comprising nodes connected by communication paths as well as a controller and data store configured to determine backup paths between the nodes, in accordance with various aspects of the technologies disclosed herein.

FIG. 1 illustrates an example network 100 comprising nodes 110 connected by communication paths as well as a controller 120 and a data store 122 configured to determine backup paths between the nodes 110, in accordance with various aspects of the technologies disclosed herein. The network 100 can include any number of nodes and any configuration of communication paths therebetween, and the illustrated nodes 110 and communication paths are examples only.

In the illustrated example, the nodes 110 comprise node 112, node 114, node 116, and node 118. A first fiber optic link L1 connects nodes 112 and 114, and L1 supports two example wavelengths, W1 and W2. Therefore, there are two communication paths between node 112 and node 114, namely, L1W1 and L1W2. A second fiber optic link L2 connects nodes 112 and 116, and L2 also supports wavelengths W1 and W2. Therefore, there are two communication paths between node 112 and node 116, namely, L2W1 and L2W2. A third fiber optic link L3 connects nodes 116 and 118, and L3 also supports wavelengths W1 and W2. Therefore, there are two communication paths between node 116 and node 118, namely, L3W1 and L3W2. A fourth fiber optic link L4 connects nodes 118 and 114, and L4 also supports wavelengths W1 and W2. Therefore, there are two communication paths between node 116 and node 118, namely, L4W1 and L4W2. A fifth fiber optic link L5 connects nodes 116 and 114, and L5 also supports wavelengths W1 and W2. Therefore, there are two communication paths between node 116 and node 114, namely, L5W1 and L5W2.

An optical network such as network 100 can support multiple circuits. For example, a first circuit (not shown in FIG. 1) may have an active path along communication path L1W1, and a second circuit (not shown in FIG. 1) may have an active path along communication path L1W2. In one example, the first circuit and the second circuit may have a same backup path comprising, e.g., L5W1 and L2W1. In such a scenario, L5W1 and L2W1 would each have higher backup path contention than, e.g., L5W2 or L2W2, which in this example are not included in backup paths for any circuits. Techniques according to this disclosure can be used to move the backup path of the first circuit or the second circuit to communication paths associated with lower backup path contention, e.g., the backup path for the first circuit can be moved to L5W2 and L2W2, or for example to L4W2, L3W2, and L2W2, thereby reducing the overall backup path contention between the nodes 110.

Techniques according to this disclosure can be used to determine/measure backup path contention of the different communication paths and modify backup paths to reduce the backup path contention of one or more communication paths. The controller 120 can be configured to determine a backup path contention metric for each of the communication paths L1W1, L1W2, L2W1, L2W2, L3W1, L3W2, L4W1, L4W2, L5W1, and L5W2. The backup path contention metric for each communication path can be stored in the data store 122. The controller 120 can then use the stored backup path contention metrics to select high-contention communication paths from among the communication paths L1W1, L1W2, L2W1, L2W2, L3W1, L3W2, L4W1, L4W2, L5W1, and L5W2, and the controller 120 can recalculate the backup paths of one or more circuits using the high-contention communication paths in their backup paths.

The network 100 illustrated in FIG. 1 is simplified, and real-world networks are more complex. The problem of backup path contention grows exponentially with the number of circuits. Circuits may also be referred to herein as services. The problem becomes progressively more difficult as the number of services and network 100 complexity increases. Furthermore, factors such as the addition of a new service, the addition or removal of a communication link or communication path, the addition or removal of a node, or other network 100 topology changes can further complicate the backup path contention problem in the network 100.

Embodiments of this disclosure can be implemented via a process performed in the controller 120 which can run in a steady-state network 100 and help reduce/minimize and in some cases eliminate any backup path contention on a given link and wavelength in a network 100. Embodiments can be robust enough to operate effectively despite the potential complexity of the backup path contention problem. In some embodiments, the controller 120 can be implemented via an SDN and/or a PCE.

Figure 2:
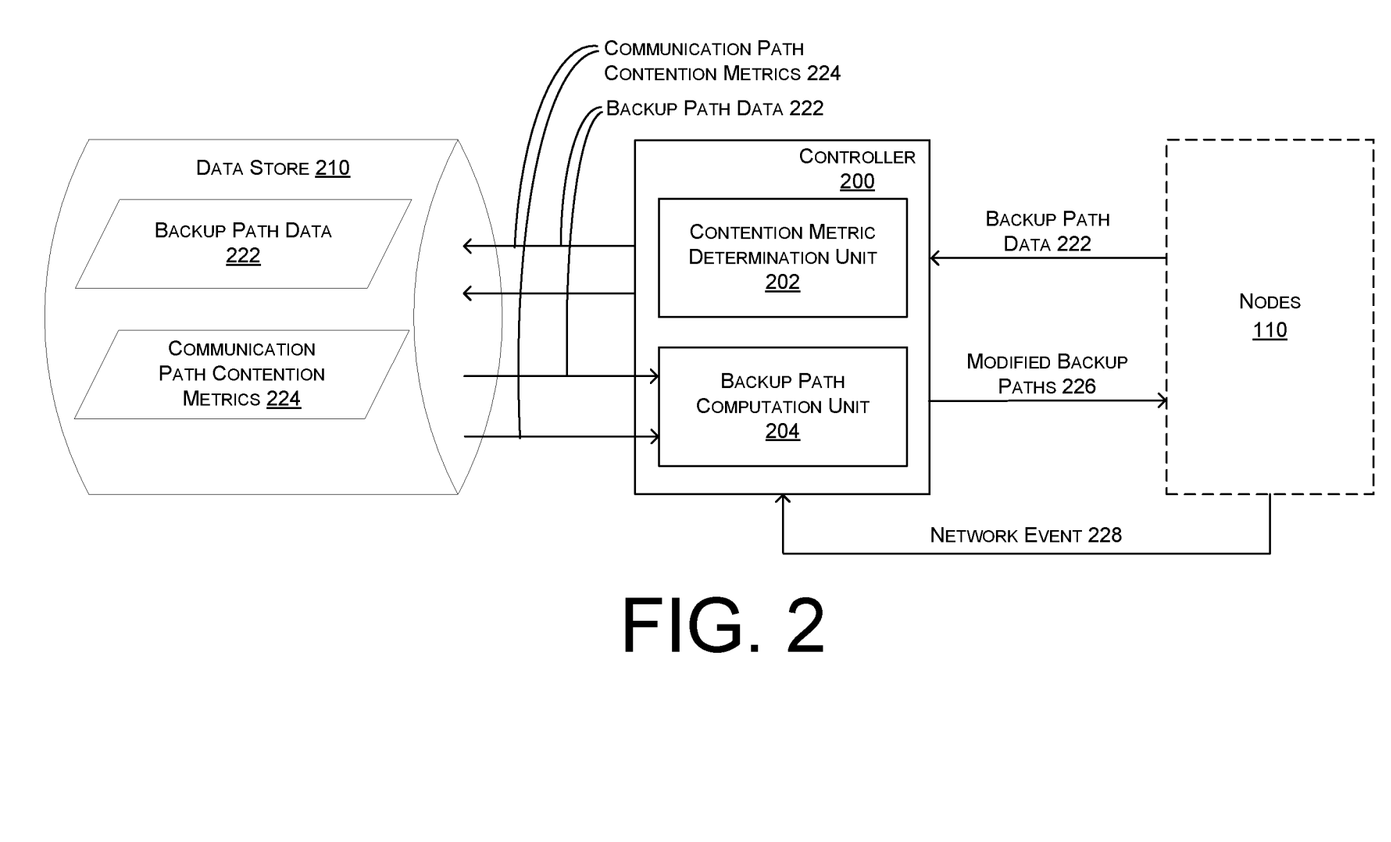
FIG. 2 illustrates an example controller and data store configured to determine backup paths through a network, in accordance with various aspects of the technologies disclosed herein.

FIG. 2 illustrates an example controller 200 and data store 210 configured to determine backup paths through a network, in accordance with various aspects of the technologies disclosed herein. The controller 200 and data store 210 can implement the controller 120 and the data store 122 introduced in FIG. 1 in some embodiments. FIG. 2 also includes the nodes 110 previously introduced in FIG. 1.

In FIG. 2, the example controller 200 comprises a contention metric determination unit 202 and a backup path computation unit 204. The example data store 210 comprises backup path data 222 and communication path contention metrics 224.

In example operations according to FIG. 2, the controller 200 can be configured to collect backup path data 222 from the nodes 110, and the controller 200 can store the backup path data 222 in the data store 210. The backup path data 222 can comprise, e.g., the backup paths of some or all the circuits that use the nodes 110. The contention metric determination unit 202 can use the backup path data 222 to determine communication path contention metrics 224, and the controller 200 can store the communication path contention metrics 224 in the data store 210 along with the backup path data 222. The communication path contention metrics 224 can comprise, e.g., a contention metric associated with each communication path between the nodes 110. The communication path contention metrics 224 can be based on the backup path data 222, e.g., a communication path contention metric associated with a communication path can relate to a number of circuits that include the communication path in their backup path.

The controller 200 can be configured to start the backup path computation unit 204 in response to a triggering event, e.g., a network event 228 such as a network topology change, or a periodic automated trigger, or an administrator-initiated trigger. The backup path computation unit 204 can be configured to use the stored communication path contention metrics 224 and the backup path data 222 to recalculate backup paths for one or more circuits that use the nodes 110, resulting in modified backup paths 226. The backup path computation unit 204 can deploy the modified backup paths 226 to the nodes 110 and/or store the modified backup paths 226 at the controller 200 or data store 210 for use in the event of a link or communication path failure in the nodes 110.

Figure 3:
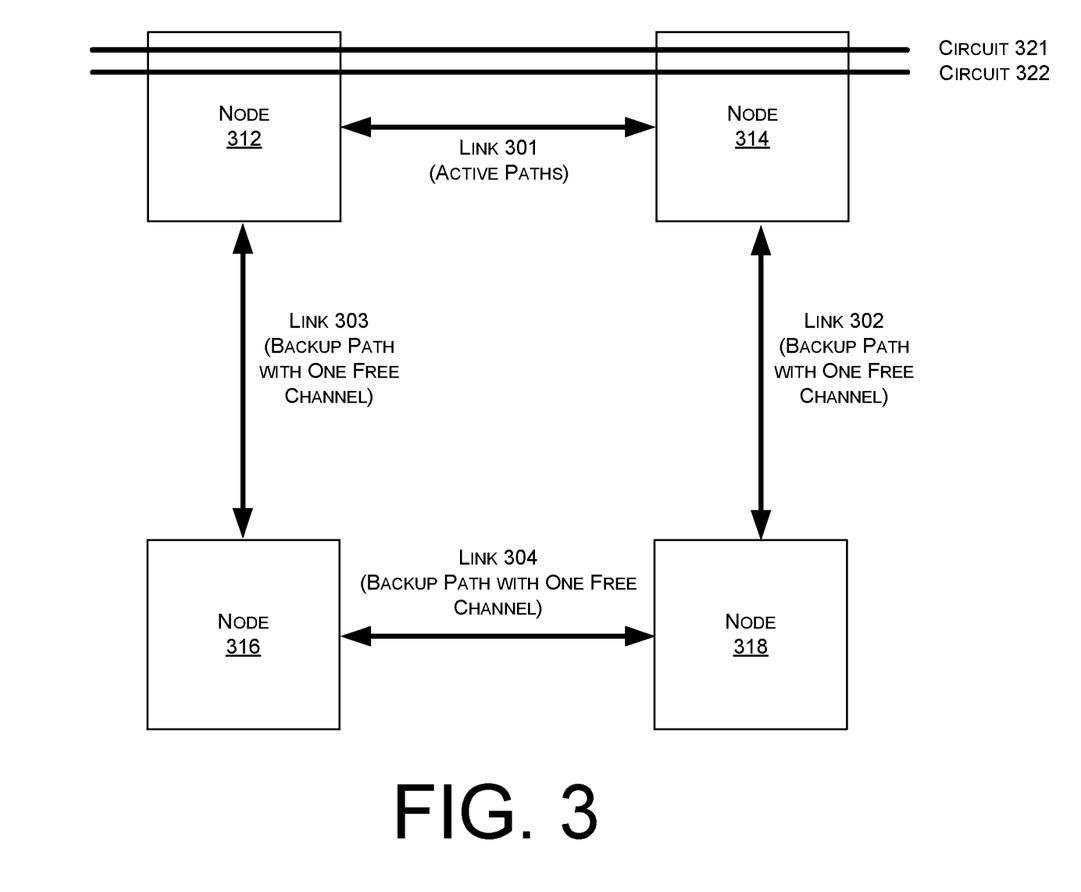
FIG. 3 illustrates example nodes connected by links and circuits that can have active paths and backup paths through the nodes and links, in accordance with various aspects of the technologies disclosed herein.

FIG. 3 illustrates example nodes 312, 314, 316, 318 connected by links 301, 302, 303, 304, and circuits 321, 322 that can have active paths and backup paths through the nodes 312, 314, 316, 318 and links 301, 302, 303, 304, in accordance with various aspects of the technologies disclosed herein.

In an example according to FIG. 3, both circuit 321 and circuit 322 can have an active path via link 301. Also, both circuit 321 and circuit 322 can have a backup path that traverses link 303, node 318, link 304, node 316, and link 303. In the illustrated example, each of the links 302, 303, and 304 has one free channel, e.g., one free wavelength. Therefore, the circuits 321 and 322 can each use, for their backup path, the communication paths available via the free channels in links 302, 304 and 303.

In FIG. 3, both circuit 321 and circuit 322 have a same end-to-end active path between nodes 312 and 314, so both circuit 321 and circuit 322 will fail at the same time in the event of a link 301 failure. Since in the example each of the link 302, link 304, and link 303 has only one wavelength/channel free, the circuits 321 and 322 will experience resource contention for the link 302, link 304, and link 303 when attempting restoration via their backup paths. The circuits 321 and 322 have no knowledge of each other, so both circuits 321 and 322 will compute link 302, link 304, and link 303 as their backup path. Only one of the circuits 321 and 322 will get link 302, link 304, and link 303 as a backup path in the event of a failure on the active path via link 301, and the other remaining circuit will have to look for another backup path in order to attempt restoration.

To address the problem illustrated in FIG. 3, this disclosure introduces a backup path contention metric that can be used to reduce backup path contention in networks. The example backup path contention metric introduced herein is referred to as a link shared resource metric (LSRM). It should be appreciated that the LSRM introduced herein is one example, and other contention metrics can potentially be defined and used in connection with modified versions of the processes described herein.

LSRM can comprise a parameter defined as the actual utilization versus computed utilization for a given wavelength on a given link for backup path computation. Actual utilization can be 1, since only one circuit can actually use a given wavelength as a backup path. However, the computed utilization can be more than 1, because a same link and wavelength can be included in a backup path of more than one circuit at the same time.

A mathematical representation of LSRM for a Link N is set forth below. In the below representation, $L_p W_k$ is a link (L) with index p and wavelength k, and n is an iterative counter for the circuit in the network:

$$LSRM(L_p W_k) = 1 : \sum_{n=0}^{max} \text{Circuit}_{L_p W_k}$$

In the example illustrated in FIG. 3, the LSRM for each of links 302, 304, and 303 is 1:2=0.5, because each of links 302, 304, and 303 comprises one-time slot/wavelength that is computed as a backup by two circuits 321 and 322.

In another example calculation of LSRM values, consider a network comprising five links, LINK1, LINK2, LINK3, LINK4, and LINK5, each of the links comprising one available wavelength W1. Four different circuits, CKT1, CKT2, CKT3, and CKT4 have backup paths that use the links, as follows:

CKT1 backup path 1: LINK1 W1::LINK2 W1:::LINK3 W1

CKT2 backup path 2: LINK1 W1::LINK2 W1:::LINK3 W1:::LINK4:W1:::LINK5:W1

CKT3 backup path 3: LINK1 W1::LINK2 W1

CKT4 backup path 4: LINK1 W1::LINK2 W1:::LINK3 W1:::LINK4:W1

The LSRM values for the above link/wavelength combinations can be determined as a ratio of 1 to the total number of circuits using the link/wavelength. Therefore:

LSRM for LINK1 for W1 is [1:4]=0.25
LSRM for LINK2 for W1 is [1:4]=0.25
LSRM for LINK3 for W1 is [1:3]=0.33
LSRM for LINK4 for W1 is [1:2]=0.5
LSRM for LINK5 for W1 is [1:1]=1.0

In some embodiments, a LSRM can generally have any value between (0,1]. However, when there is no circuit that uses a given link in its backup path, embodiments can set the LSRM to a very high value, such as 999 or higher, thereby effectively setting the LSRM to infinity.

When a communication path is assigned an LSRM value of 1, the LSRM value represents that a single circuit has included the communication path (e.g., a wavelength on a given link) in its backup path, with no other circuits using the same communication path in a backup path, and therefore there is no competition/contention for the communication path. An LSRM value as close as possible to 1 on each communication path of a target network is desirable. Meanwhile, smaller LSRM values represent higher contention/conflict, with multiple circuits having included a communication path in their backup path computation.

Figure 4:
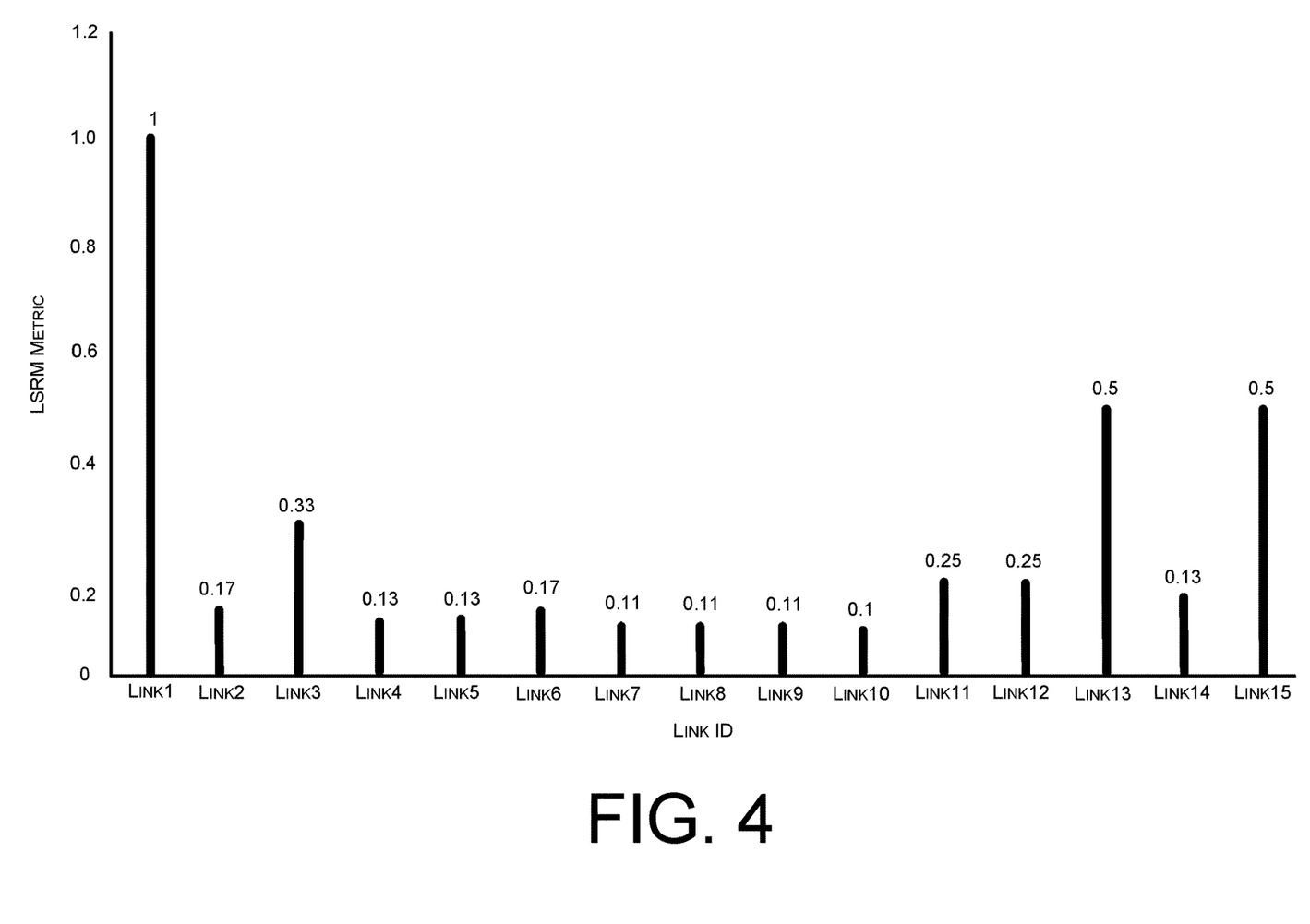
FIG. 4 is a graph illustrating example contention metrics associated with different communication paths in a network, in accordance with various aspects of the technologies disclosed herein.

FIG. 4 is a graph illustrating example contention metrics associated with different communication paths in a network, in accordance with various aspects of the technologies disclosed herein. FIG. 4 illustrates example LSRM values for each of 15 different links in an example target network. Each determined link LSRM value is represented on a graph, and each determined link LSRM value has a value in the range between 0 and 1, as per the LSRM computation model outlined above. In the illustrated example, all the 15 links are used in backup paths of at least one circuit, and so none of the links has a very high (infinity) LSRM value.

LSRM values such as illustrated in FIG. 4 can be determined for different communication paths (referred to in FIG. 4 as links) in a network. For example, the illustrated link identifiers and corresponding LSRM values can be determined by a controller 200 and stored in a data store 210 as communication path contention metrics 224. In the illustrated example, link1 has a controller 200 determined LSRM value of 1. Link2 has a controller 200 determined LSRM value of 0.17. Link3 has a controller 200 determined LSRM value of 0.17. Link3 has a controller 200 determined LSRM value of 0.33. Link4 has a controller 200 determined LSRM value of 0.13. Link5 has a controller 200 determined LSRM value of 0.13. Link6 has a controller 200 determined LSRM value of 0.17. Link7 has a controller 200 determined LSRM value of 0.11. Link8 has a controller 200 determined LSRM value of 0.11. Link9 has a controller 200 determined LSRM value of 0.11. Link10 has a controller 200 determined LSRM value of 0.1. Link11 has a controller 200 determined LSRM value of 0.25. Link12 has a controller 200 determined LSRM value of 0.25. Link13 has a controller 200 determined LSRM value of 0.5. Link14 has a controller 200 determined LSRM value of 0.13. Link5 has a controller 200 determined LSRM value of 0.5.

Embodiments can furthermore make use of a contention metric threshold. An example contention metric threshold introduced herein is an LSRM threshold for use with LSRM type contention metrics, however, other contention metric thresholds can be used in connection with modified versions of the processes disclosed herein.

An LSRM threshold can be defined as an optionally administrator provisioned value between 0 and 1. The use of an LSRM threshold can generally enable pruning of links from a backup path optimization execution cycle described herein. Each link associated with an LSRM value that does not violate the LSRM threshold can be excluded from the backup path optimization execution cycle. Meanwhile, links associated with LSRM values that do violate the LSRM threshold can be included in the backup path optimization execution cycle. A default LSRM threshold such as, e.g., 0.5, can be employed in some embodiments, and the default LSRM threshold can optionally be modified by an administrator.

A contention metric threshold such as LSRM threshold can be defined as an allowed extent of simultaneous sharing of a link wavelength among backup paths. A link/communication path can be allowed to be shared between 1:X, circuits where X represents the allowed number of target circuits. An LSRM threshold of 0.5 therefore represents a "worst case" sharing of one link/wavelength among backup paths of two circuits. An LSRM threshold of 1 represents a "worst case" sharing of one link/wavelength among one circuit (i.e., no sharing allowed). Different LSRM threshold may be appropriate for different network circumstances, such as different backup path availability. An ideal LSRM threshold value of 1 is desirable but may not be practical for some networks. An LSRM threshold of 0.5 can be a robust practical target LSRM threshold value for many networks.

Figure 5A:
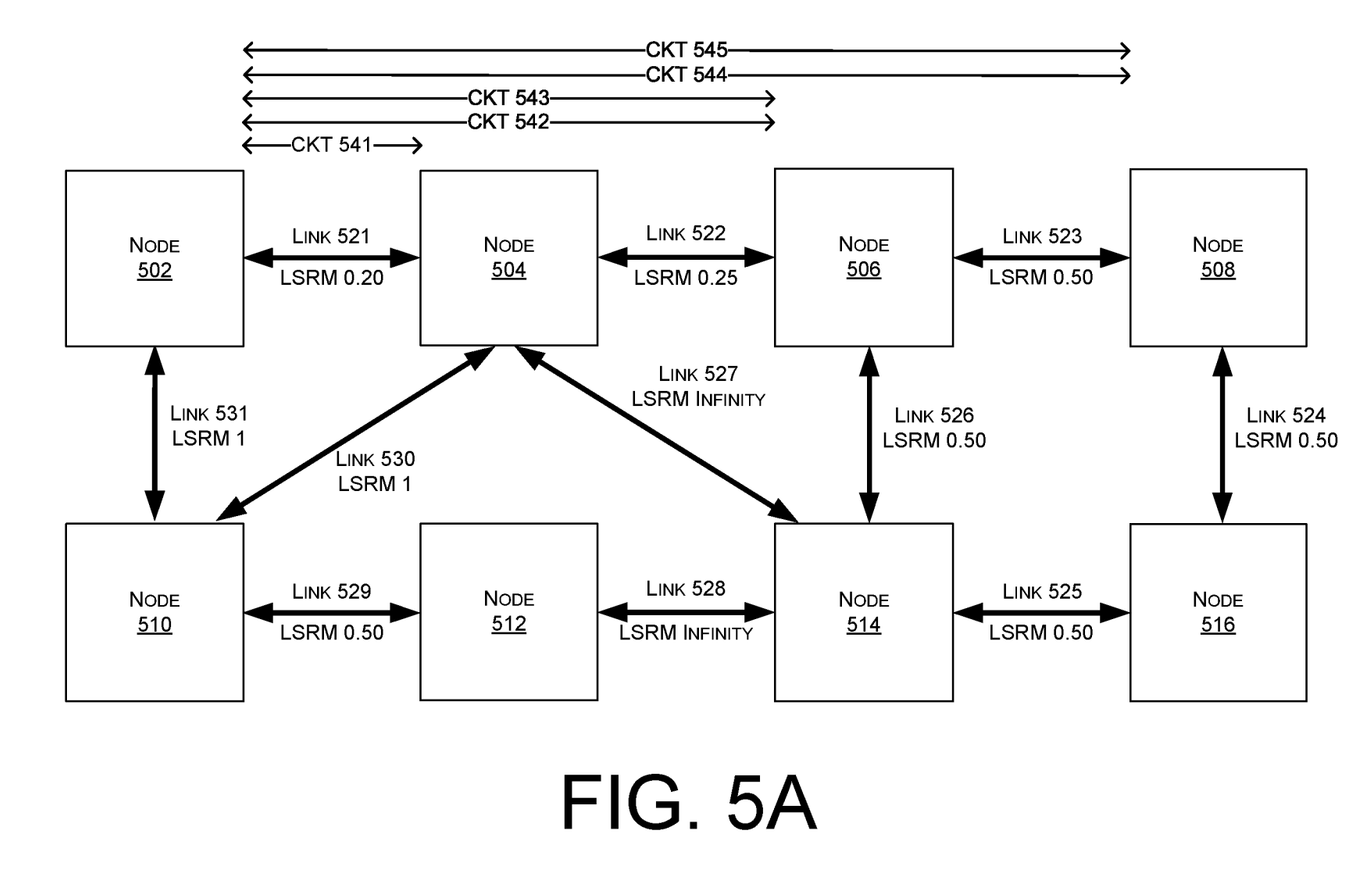
FIG. 5A illustrates example nodes connected by links and first example backup paths of circuits via the links, wherein the links are associated with first example contention metrics, in accordance with various aspects of the technologies disclosed herein.
Figure 5B:
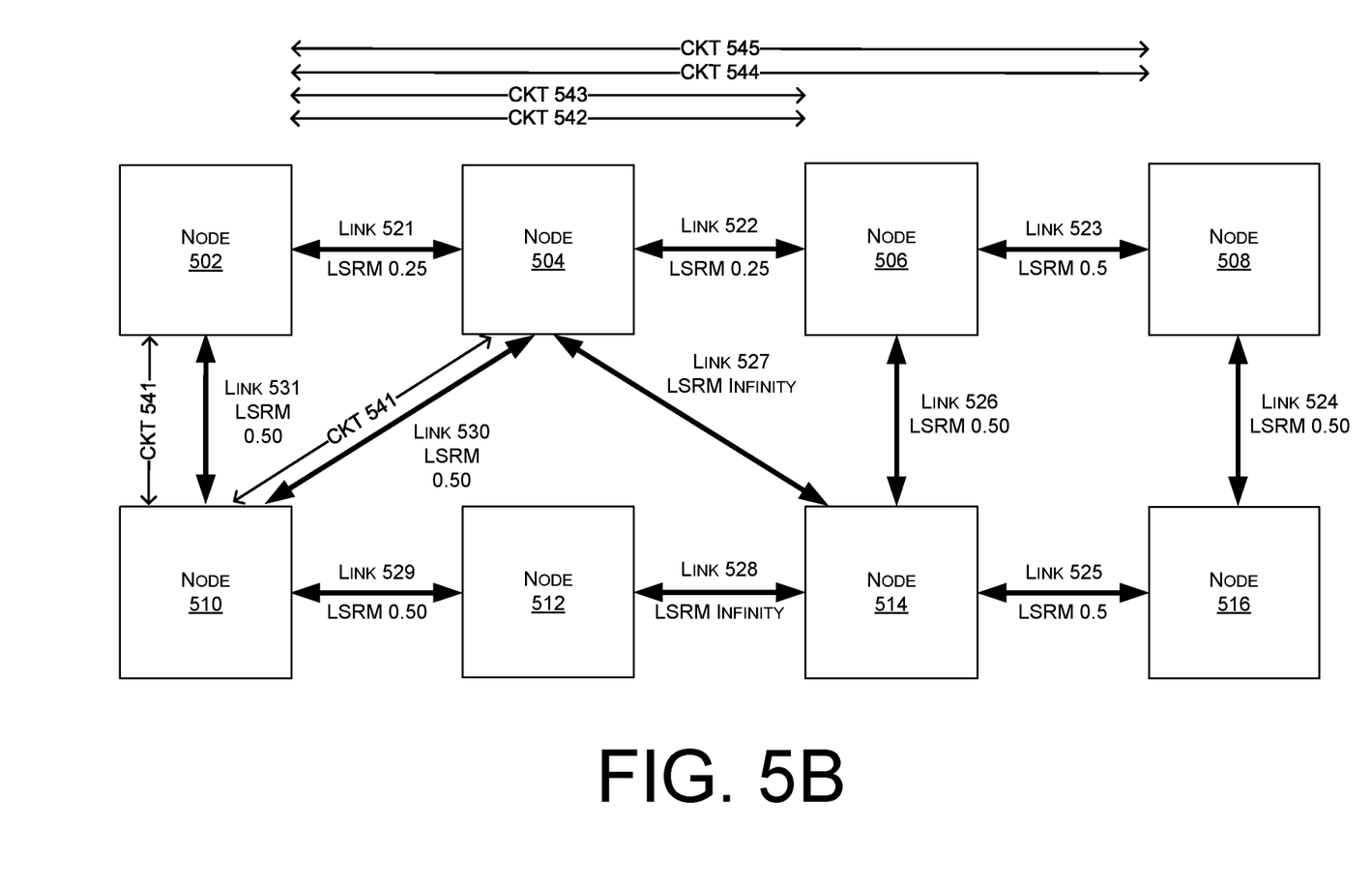
FIG. 5B illustrates the example nodes connected by links introduced in FIG. 5A, and second example backup paths of circuits via the links, wherein the links are associated with second example contention metrics, in accordance with various aspects of the technologies disclosed herein.

FIG. 5A and FIG. 5B represent example, nodes, links, and circuit backup paths in a first state and second state, respectively, wherein the first state illustrated in FIG. 5A is before an example modification of circuit backup paths, and wherein the second state illustrated in FIG. 5B is after modification of the backup paths. FIG. 5A and FIG. 5B therefore represent operation of one backup path optimization execution cycle that can be performed by a controller such as controller 200 introduced in FIG. 2. The controller 200 can perform further backup path optimization execution cycles as needed to further modify the backup paths.

FIG. 5A illustrates example nodes 502, 504, 506, 508, 510, 512, 514, 516 connected by links 521, 522, 523, 524, 525, 526, 527, 528, 529, 530, and 531, and first example backup paths of circuits 541, 542, 543, 544, 545 via the links 521, 522, 523, 524, 525, 526, 527, 528, 529, 530, and 531, wherein the links 521, 522, 523, 524, 525, 526, 527, 528, 529, 530, and 531 are associated with first example contention metrics, in accordance with various aspects of the technologies disclosed herein. FIG. 5B illustrates the example nodes 502, 504, 506, 508, 510, 512, 514, 516 connected by the links 521, 522, 523, 524, 525, 526, 527, 528, 529, 530, and 531 introduced in FIG. 5A, and second example backup paths of circuits 541, 542, 543, 544, 545 via the links 521, 522, 523, 524, 525, 526, 527, 528, 529, 530, and 531, wherein the links 521, 522, 523, 524, 525, 526, 527, 528, 529, 530, and 531 are associated with second example contention metrics, in accordance with various aspects of the technologies disclosed herein.

In FIG. 5A, the link 521 is associated with a contention metric (LSRM) of 0.20. The link 522 is associated with an LSRM of 0.25. The link 523 is associated with an LSRM of 0.50. The link 524 is associated with an LSRM of 0.50. The link 525 is associated with an LSRM of 0.50. The link 526 is associated with an LSRM of 0.50. The link 527 is associated with an LSRM of infinity (or other value much larger than 1). The link 528 is associated with an LSRM of infinity (or other value much larger than 1). The link 529 is associated with an LSRM of 0.50. The link 530 is associated with an LSRM of 1. The link 531 is associated with an LSRM of 1.

In FIG. 5A, a backup path for circuit (CKT) 541 includes link 521. A backup path for circuit 542 includes links 521 and 522. Similarly, a backup path for circuit 543 includes links 521 and 522. A backup path for circuit 544 includes links 521, 522, and 523. Similarly, a backup path for circuit 545 includes links 521, 522, and 523. In FIG. 5A and FIG. 5B, the term "link" can refer to a link/wavelength combination, i.e., a communication path.

FIG. 5B represents a second state, after modification of the backup paths illustrated in FIG. 5A, as noted above. The backup paths can be modified by a controller such as the controller 200 illustrated in FIG. 2. The backup path computation unit 204 can be configured to implement backup path optimization execution cycle, and a state change from the first state illustrated in FIG. 5A to the second state illustrated in FIG. 5B can be a result of a first example cycle of the backup path optimization execution cycle performed by the controller 200.

In FIG. 5B, a new backup path for circuit 541 includes links 531 and 530, and the LSRM values for links 521, 530, and 531 have been updated accordingly. The updated LSRM value for link 521 is 0.25. The updated LSRM value for link 530 is 0.50. The updated LSRM value for link 531 is 0.50. The backup paths for the other circuits 542, 543, 544, and 545 have not been modified, although those backup paths can be modified by further iterations of the backup path optimization execution cycle performed by the controller 200.

Prior to performing the backup path optimization execution cycle that results in transition from FIG. 5A to FIG. 5B, the controller 200 can list/maintain a data store 210 comprising backup path data 222, which can include computed backup paths for all active circuits 541, 542, 543, 544, 545 present in the network. The contention metric determination unit 202 can determine LSRM values for each link/wavelength in the backup path computation across all active circuits 541, 542, 543, 544, 545, for example, the contention metric determination unit 202 can determine the LSRM values for the links 521, 522, 523, 524, 525, 526, 527, 528, 529, 530, and 531 illustrated in FIG. 5A. The LSRM values can be stored as communication path contention metrics 224.

Once the controller 200 has determined the LSRM values illustrated in FIG. 5A, the controller 200 can initiate a backup path optimization execution cycle, optionally in response to a network event 228. An example backup path optimization execution cycle can comprise the below example operations.

In a first example operation of a backup path optimization execution cycle, the controller 200 can select a first link to be optimized. In some embodiments, the controller 200 can select a high-contention, or highest contention link/communication path. Using the LSRM described herein, the highest contention link will have the lowest LSRM value. For example, in FIG. 5A, link 521 has the lowest LSRM and so can be selected as the first link to be optimized. In the event that more than one link has the lowest LSRM value, embodiments can select any one of the lowest LSRM value links to move forward.

In a second example operation of a backup path optimization execution cycle, the controller 200 can compute a combined LSRM value for each circuit that uses the selected link in its backup path. For example, the controller 200 can compute a combined LSRM value for each of circuits 541, 542, 543, 544, and 545 that use the selected link 521. The combined LSRM value can be, e.g., an aggregate LSRM value computed by adding the LSRM values of each of the links used by a circuit. In the illustrated example:

CKT 541 Aggregate LSRM=0.20
CKT 542 Aggregate LSRM=LINK1 LSRM+LINK2 LSRM=(0.20+0.25)=0.45
CKT 543 Aggregate LSRM=LINK1 LSRM+LINK2 LSRM=(0.20+0.25)=0.45
CKT 544 Aggregate LSRM=LINK1 LSRM+LINK2 LSRM+LINK3 LSRM=(0.20+0.25+0.50)=0.95
CKT 545 Aggregate LSRM=LINK1 LSRM+LINK2 LSRM+LINK3 LSRM=(0.20+0.25+0.50)=0.95

In a third example operation of a backup path optimization execution cycle, the controller 200 can select a circuit for backup path optimization. The selected circuit can comprise, e.g., a circuit which has a lower or lowest aggregate LSRM value. In the illustrated example, circuit 541 can be selected. In summary, the candidate link selected for optimization in the first operation was link 521, and the candidate circuit selected to be optimized in the second operation was circuit 541.

In a fourth example operation of a backup path optimization execution cycle, the controller 200 can find available alternate backup paths for the selected circuit (circuit 541) which exclude the selected link (link 521). The available alternate backup paths can include those paths comprising only links with individual LSRM values higher than the current selected link 521 LSRM value. The controller 200 can select a modified backup path for the selected circuit (circuit 541) from among available alternate backup paths. For example, the controller 200 can choose an alternate backup path for circuit 541, the alternate backup path comprising link 531 (LSRM value=1) and link 530 (LSRM value=1).

In a fifth example operation of a backup path optimization execution cycle, the controller 200 can modify the backup path of the selected circuit 541, by changing the backup path of the selected circuit to the modified backup path selected in the fourth operation. The controller 200 can furthermore update LSRM values across the network, resulting, e.g., in the LSRM values illustrated in FIG. 5B. The controller 200 can store the updated LSRM values as a new instance of communication path contention metrics 224.

The above-described example operations of a backup path optimization execution cycle can optionally be repeated until either all links are optimized in a network, or a convergence point is reached. To converge the backup path optimization execution cycle, in some embodiments, each link that has a current contention metric indicative of an acceptable contention level, e.g., a contention metric that satisfies the contention threshold such as an LSRM metric of 0.5 or 1, can be excluded from each subsequent iteration of the backup path optimization execution cycle. The backup path optimization execution cycle can converge when either all links are excluded (all links satisfy the threshold), or all links have been processed. In summary, the backup path optimization execution cycle can automatically distribute backup paths in such a manner that restoration due to a catastrophic failure will see the least possible amount of contention for resources between the circuits under the restoration event.

In some example use cases, the disclosed backup path optimization execution cycle can run automatically, e.g., in response to an administrator instruction or network event. In other example use cases, outcomes of the disclosed backup path optimization execution cycle can be presented to an administrator/user in the form of a choice list against each set of circuits where backup path optimization is offered to resolve conflict/failures during restoration events. In still further example use cases, the disclosed backup path optimization execution cycle can be run selectively on a specific link or set of links selected by a user.

Figure 6:
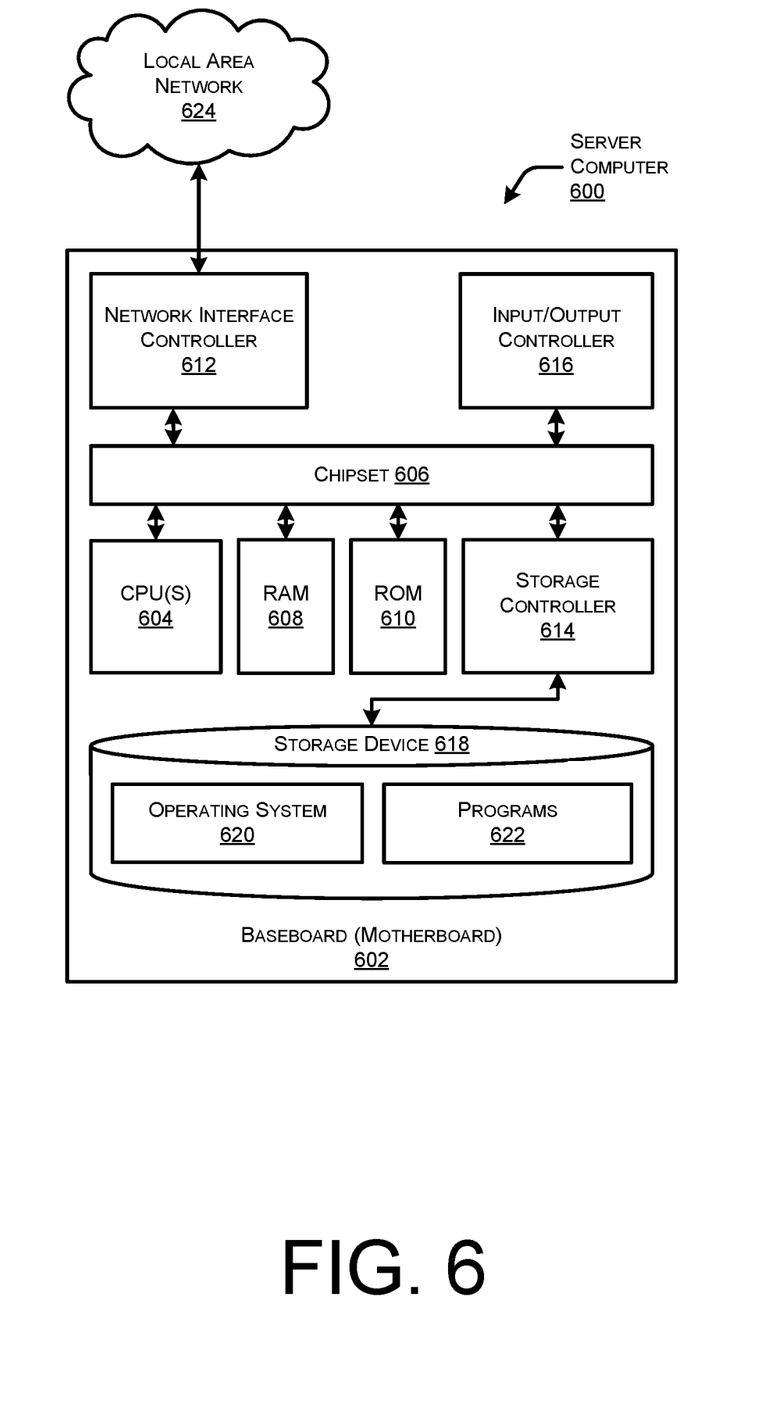
FIG. 6 illustrates an example computer hardware architecture that can implement a server device that can host a controller and database, in accordance with various aspects of the technologies disclosed herein.

FIG. 6 illustrates an example computer hardware architecture that can implement a server device that can a controller 200 and data store 210, in accordance with various aspects of the technologies disclosed herein. The computer architecture shown in FIG. 6 illustrates a conventional server computer, workstation, desktop computer, laptop, tablet, network appliance, e-reader, smartphone, or other computing device, and can be utilized to execute any of the software components presented herein.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to startup the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the network 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein. The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIG. 1, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above. According to one embodiment, the server computer 600 has access to computer-readable storage media storing computer-executable instructions which, when executed by the server computer 600, perform the various processes described with regard to FIG. 7. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

Figure 7:
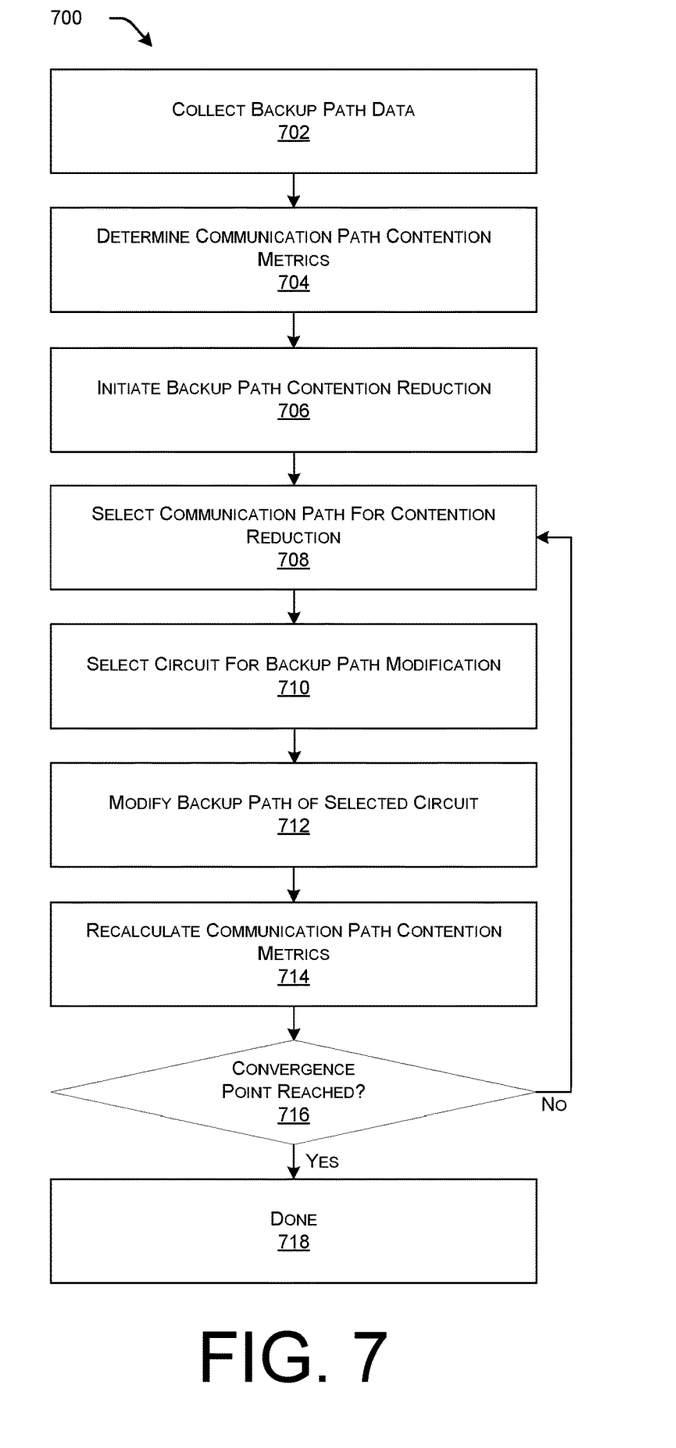
FIG. 7 is a flow diagram that illustrates an example method performed by a controller to reduce backup path contention in a network, in accordance with various aspects of the technologies disclosed herein.

FIG. 7 is a flow diagram of an example method 700 performed at least partly by controller 200. The logical operations described herein with respect to FIG. 7 may be implemented (1) as a sequence of computer-implemented acts or program modules running on a computing system and/or (2) as interconnected machine logic circuits or circuit modules within the computing system. In some examples, the method 700 may be performed by a system comprising one or more processors and one or more non-transitory computer-readable media storing computer-executable instructions that, when executed by the one or more processors, cause the one or more processors to perform the method 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 is a flow diagram that illustrates an example method performed by a controller 200 to reduce backup path contention in a network, in accordance with various aspects of the technologies disclosed herein. At operation 702, the controller 200 can collect backup path data 222 from the network, e.g., from the nodes 110 and/or from circuits using the nodes.

At operation 704, the controller 200 can determine communication path contention metrics 224. For example, with reference to FIG. 5A, the controller 200 can determine a first contention metric (LSRM 0.20) associated with a first communication path (via link 521) between first nodes 502, 504 of an optical network, wherein the first contention metric (LSRM 0.20) is based on a first number (e.g., 5) of first circuits 541, 542, 543, 544, 545 designating the first communication path (via link 521) as part of first backup paths for use in response to failure of first active paths used by the first circuits 541, 542, 543, 544, 545. The controller 200 can furthermore determine a second and/or further additional contention metrics (e.g., LSRM 0.25) associated with a second communication path (via link 522) between second nodes 504, 506 of the optical network, wherein the second contention metric (e.g., LSRM 0.25) is based on a second number (e.g., 4) of second circuits 542, 543, 544, 545 designating the second communication path (via link 522) as part of second backup paths for use in response to failure of second active paths used by the second circuits 542, 543, 544, 545. The first communication path (via link 521) and the second communication path can each comprise, e.g., an optical network link and wavelength pair.

The controller 200 can store the backup path data 222 in the data store 210. For example, the controller 200 can store the first contention metric (LSRM 0.20) in association with the first communication path (via link 521) in the data store 210, and the controller 200 can likewise store the second and any further contention metrics (e.g., LSRM 0.25) in association with the second communication path (via link 522) in the data store 210.

At operation 706, the controller 200 can initiate backup path contention reduction. Operation 706 can be responsive a user input or can be triggered automatically, e.g., in response to an optical network event 228 such as a network topology change. The remaining operations 708, 710, 712, 714, 716, and 718 can carry out a backup path optimization execution cycle such as described herein and can be performed for example by the backup path computation unit 204 introduced in FIG. 2.

At operation 708, the controller 200 can select a communication path for contention reduction. For example, with reference to FIG. 5A, the controller 200 can determine, based at least in part on the first contention metric (LSRM 0.20) and the second contention metric (LSRM 0.25), to reduce the first number (e.g., 5) of first circuits 541, 542, 543, 544, 545.

The determining to reduce the first number (e.g., 5) of first circuits 541, 542, 543, 544, 545 can be based on the first contention metric (LSRM 0.20) indicating that the first number (e.g., 5) of first circuits 541, 542, 543, 544, 545 is higher than the second number (e.g., 4) of second circuits 542, 543, 544, 545 and therefore the first communication path (via link 521) has a higher backup path contention than the second communication path (via link 522). The determining to reduce the first number (e.g., 5) of first circuits 541, 542, 543, 544, 545 can be further based on the first contention metric (LSRM 0.20) violating a contention metric threshold, such as 0.5.

At operation 710, the controller 200 can a circuit for backup path modification. The controller 200 can select a circuit that includes the selected communication path (via link 521) in its backup path. In some embodiments, the controller 200 can select at least one of the first backup paths (the backup paths using the first communication path via link 521) at least in part by determining contention metric combinations associated with each of the first circuits 541, 542, 543, 544, 545, wherein the contention metric combinations comprise combinations of contention metrics associated with communication paths included in the first backup paths. For example, the controller 200 can aggregate LSRM values on communication paths used by each of the first circuits 541, 542, 543, 544, 545, as described in connection with FIG. 5A. In the example illustrated in FIG. 5A, the selected circuit is circuit 541.

At operation 712, the controller 200 can modify a backup path of a selected circuit. The backup path of the circuit selected at operation 708, namely, circuit 541, can be modified. Operation 712 can modify the backup path of circuit 541 in a manner that reduces the first number (e.g., 5) of first circuits 541, 542, 543, 544, 545. As a result of operation 712, circuit 541 can be associated with a modified backup path, e.g., a path that includes links 530 and 531, wherein the modified backup path avoids the first communication path (via link 521).

At operation 714, the controller 200 can recalculate communication path contention metrics. For example, after reducing the first number of first circuits that use communication path (via link 521), the controller 200 can recalculate the first contention metric (LSRM 0.20) and the second contention metric (LSRM 0.25), as well as other contention metrics, as shown in FIG. 5B. The recalculated contention metrics can optionally be stored in the data store 210.

At 716, the controller 200 can determine if a convergence point is reached, e.g., by every link in the network having a contention metric that does not violate the designated contention threshold. If the convergence point is reached, the controller 200 can proceed to done 718, and terminate the backup path optimization execution cycle of operations 708-716. If the convergence point is not reached, the controller 200 can return to operation 708 and select a next communication path for contention reduction.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    determining a first contention metric associated with a first communication path between first nodes of an optical network, wherein the first contention metric is based on a first number of first circuits designating the first communication path as part of first backup paths for use in response to failure of first active paths used by the first circuits;
    determining a second contention metric associated with a second communication path between second nodes of the optical network, wherein the second contention metric is based on a second number of second circuits designating the second communication path as part of second backup paths for use in response to failure of second active paths used by the second circuits;
    determining, based at least in part on the first contention metric and the second contention metric, to reduce the first number of first circuits; and
    reducing the first number of first circuits by modifying at least one of the first backup paths, resulting in a modified backup path that avoids the first communication path.

2. The method of claim 1, wherein the determining to reduce the first number of first circuits is based on the first contention metric indicating that the first number of first circuits is higher than the second number of second circuits.

3. The method of claim 1, wherein the determining to reduce the first number of first circuits is further based on the first contention metric violating a contention metric threshold.

4. The method of claim 1, further comprising:
    storing the first contention metric in association with the first communication path in a data store; and
    storing the second contention metric in association with the second communication path in the data store.

5. The method of claim 1, further comprising selecting the at least one of the first backup paths at least in part by determining contention metric combinations associated with each of the first circuits, wherein the contention metric combinations comprise combinations of contention metrics associated with communication paths included in the first backup paths.

6. The method of claim 1, further comprising recalculating the first contention metric and the second contention metric after reducing the first number of first circuits.

7. The method of claim 1, wherein at least the determining to reduce the first number of first circuits and the reducing the first number of first circuits are triggered automatically in response to an optical network event.

8. The method of claim 1, wherein the first communication path comprises a first optical network link and wavelength pair, and wherein the second communication path comprises a second optical network link and wavelength pair.

9. A device comprising:
one or more processors;
one or more computer-readable media storing computer-executable instructions that, when executed by the one or more processors, cause the one or more processors to perform operations comprising:
determining a first contention metric associated with a first communication path between first nodes of an optical network, wherein the first contention metric is based on a first number of first circuits designating the first communication path as part of first backup paths for use in response to failure of first active paths used by the first circuits;
determining a second contention metric associated with a second communication path between second nodes of the optical network, wherein the second contention metric is based on a second number of second circuits designating the second communication path as part of second backup paths for use in response to failure of second active paths used by the second circuits;
determining, based at least in part on the first contention metric and the second contention metric, to reduce the first number of first circuits; and
reducing the first number of first circuits by modifying at least one of the first backup paths, resulting in a modified backup path that avoids the first communication path.

10. The device of claim 9, wherein the determining to reduce the first number of first circuits is based on the first contention metric indicating that the first number of first circuits is higher than the second number of second circuits.

11. The device of claim 9, wherein the determining to reduce the first number of first circuits is further based on the first contention metric violating a contention metric threshold.

12. The device of claim 9, wherein the operations further comprise:
storing the first contention metric in association with the first communication path in a data store; and
storing the second contention metric in association with the second communication path in the data store.

13. The device of claim 9, wherein the operations further comprise selecting the at least one of the first backup paths at least in part by determining contention metric combinations associated with each of the first circuits, wherein the contention metric combinations comprise combinations of contention metrics associated with communication paths included in the first backup paths.

14. Device of claim 9, wherein the operations further comprise recalculating the first contention metric and the second contention metric after reducing the first number of first circuits.

15. The device of claim 9, wherein at least the determining to reduce the first number of first circuits and the reducing the first number of first circuits are triggered automatically in response to an optical network event.

16. The device of claim 9, wherein the first communication path comprises a first optical network link and wavelength pair, and wherein the second communication path comprises a second optical network link and wavelength pair.

17. A method comprising:
determining a first contention metric associated with a first communication path between first nodes of an optical network, wherein the first contention metric is based on a first number of first circuits designating the first communication path as part of first backup paths for use in response to failure of first active paths used by the first circuits;
storing the first contention metric in association with the first communication path in a data store;
determining a second contention metric associated with a second communication path between second nodes of the optical network, wherein the second contention metric is based on a second number of second circuits designating the second communication path as part of second backup paths for use in response to failure of second active paths used by the second circuits; and
storing the second contention metric in association with the second communication path in the data store.

18. The method of claim 17, wherein the first communication path comprises a first optical network link and wavelength pair, and wherein the second communication path comprises a second optical network link and wavelength pair.

19. The method of claim 17, wherein the first contention metric and the second contention metric are stored for use in connection with reducing the first number of first circuits or the second number of second circuits by modifying at least one of the first backup paths or at least one of the second backup paths.

20. The method of claim 19, wherein the reducing the first number of first circuits or the second number of second circuits is based at least in part on the first contention metric or the second contention metric violating a contention metric threshold.

\* \* \* \* \*